United States Patent
Dou et al.

(10) Patent No.: US 9,785,704 B2
(45) Date of Patent: Oct. 10, 2017

(54) EXTRACTING QUERY DIMENSIONS FROM SEARCH RESULTS

(75) Inventors: Zhicheng Dou, Beijing (CN); Ruihua Song, Beijing (CN); Ji-Rong Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 13/343,621

(22) Filed: Jan. 4, 2012

(65) Prior Publication Data

US 2013/0173605 A1    Jul. 4, 2013

(51) Int. Cl.
*G06F 17/30* (2006.01)

(52) U.S. Cl.
CPC .. *G06F 17/30705* (2013.01); *G06F 17/30696* (2013.01); *G06F 17/30011* (2013.01); *G06F 17/30864* (2013.01)

(58) Field of Classification Search
CPC .......... G06Q 30/0256; G06F 17/30277; G06F 17/30592; G06F 17/30696; G06F 17/30554; G06F 17/30979; G06F 17/2705; G06F 17/30017; G06F 17/30442; G06F 17/30864; G06F 17/30973; G06F 17/30991; G06F 17/30
USPC ................................. 707/723, 765
See application file for complete search history.

(56) References Cited

U.S. PATENT DOCUMENTS

| | | | |
|---|---|---|---|
| 5,297,280 A | 3/1994 | Potts, Sr. et al. | |
| 6,192,357 B1* | 2/2001 | Krychniak | ........ G06F 17/30474 |
| 7,257,573 B2* | 8/2007 | Matsumoto | ....... G06F 17/30867 |
| 7,493,319 B1 | 2/2009 | Dash et al. | |
| 7,739,221 B2* | 6/2010 | Lawler | .............. G06F 17/30592 707/711 |
| 8,510,339 B1* | 8/2013 | Bair, Jr. | ............ G06F 17/30864 707/791 |
| 9,262,532 B2* | 2/2016 | Pueyo | ................ G06F 17/30867 |
| 2003/0014398 A1* | 1/2003 | Ohta | ................. G06F 17/30864 |
| 2003/0220917 A1* | 11/2003 | Copperman et al. | ............. 707/3 |
| 2005/0234972 A1* | 10/2005 | Zeng | ................. G06F 17/30864 |
| 2006/0116994 A1* | 6/2006 | Jonker | .............. G06F 17/30017 |
| 2007/0061232 A1* | 3/2007 | Bonissone et al. | ......... 705/36 R |
| 2007/0255754 A1* | 11/2007 | Gheel | ................ G06F 17/30867 |
| 2008/0005105 A1* | 1/2008 | Lawler | ................ G06F 17/3002 |

(Continued)

OTHER PUBLICATIONS

"Finding Dimensions for Queries", Zhincheng Dou, Yulong Luo, Ruihua Song and Ji-Rong Wen, Oct. 24-28, 2011.*

(Continued)

*Primary Examiner* — Heather Herndon
*Assistant Examiner* — Merilyn Nguyen (57) ABSTRACT

Techniques are described for automatically mining query dimensions from web pages resulting from execution of a search query. Lists of items such as words, terms, or phrases are extracted from the web pages based on the recognition of free text, metadata tag, or repeated region patterns within the web page text. Extracted item lists are weighted according to document matching and/or inverse document frequency, and item lists are clustered based on shared or similar items within the lists to generate query dimensions. The generated query dimensions, and the items within each query dimension, are ranked according to quality, and high-quality query dimensions are provided for display alongside top search results.

20 Claims, 8 Drawing Sheets

(56) References Cited

U.S. PATENT DOCUMENTS

| | | | | |
|---|---|---|---|---|
| 2009/0319518 | A1* | 12/2009 | Koudas | G06F 17/30696 |
| 2010/0268720 | A1* | 10/2010 | Spivack et al. | 707/756 |
| 2010/0299343 | A1* | 11/2010 | Ahari | G06F 17/30702 707/759 |
| 2011/0047159 | A1* | 2/2011 | Baid | G06F 17/3071 707/738 |
| 2011/0055186 | A1* | 3/2011 | Gopalakrishnan | G06F 17/30867 707/706 |
| 2011/0055238 | A1 | 3/2011 | Slaney et al. | |
| 2011/0170777 | A1* | 7/2011 | Inagaki | 382/177 |
| 2012/0290566 | A1* | 11/2012 | Dasher | G06F 17/30244 707/723 |
| 2014/0303955 | A1* | 10/2014 | Kim | G06F 17/2775 704/2 |

OTHER PUBLICATIONS

Allan, "Relevance Feedback With Too Much Data", In Proceedings of SIGIR 1995, Jul. 1995, pp. 337-343.

Anastasiu, et al., "ClusteringWiki: A Framework for Personalized Clustering of Search Results", Retrieved on: Sep. 28, 2011, Available at: http://dmlab.cs.txstate.edu/ClusteringWiki/pdf/cw.pdf, CIKM 2011 20th ACM Conf on Information and Knowledge Management, Oct. 2011, 28 pgs.

Anick et al, "Similar Term Discovery using Web Search", In Proceedings of LREC 2008, May 2008, 5 pgs.

Anick, "Using Terminological Feedback for Web Search Refinement—A Log-Based Study", Proceedings SIGIR 2003, Jul. and Aug. 2003, pp. 88-95.

Balog et al, "Entity Search: Building Bridges between Two Worlds", Proceedings of SEMSEARCH 2010, Apr. 2010, 5 pages.

Ben-Yitzhak et al, "Beyond Basic Faceted Search", In Proceedings of WSDM 2008, Feb. 2008, 11 pgs.

Bron et al, "Ranking Related Entities: Components and Analyses", Proceedings of CIKM 2010, Oct. 2010, pp. 1079-1088.

Cafarella et al, "WebTables: Exploring the Power of Tables on the Web", VLDB 2008, Aug. 2008, 1:538-549.

Cai et al, "VIPS: A Vision-based Page Segmentation Algorithm", Nov. 2003, Technical Report, Microsoft Research, 29 pgs.

Chali et al, "Unsupervised Approach for Selecting Sentences in Query-based Summarization", In Proc 21st Intl Florida Artificial Intelligence Research Society Conf, FLAIRS Conference, May 2008, pp. 47-52.

Chaudhuri et al, "An Overview of Data Warehousing and OLAP Technology", SIGMOD Rec., 26:65-74, Mar. 1997.

Cheng et al, "Supporting Entity Search: A Large-Scale Prototype Search Engine", In Proceedings of SIGMOD 2007, Jun. 2007, pp. 1144-1146.

Dakka et al, "Automatic Extraction of Useful Facet Hierarchies from Text Databases", In Proceedings of ICDE 2008, Apr. 2008, pp. 466-475.

Damova et al, "Query-based Summarization: A Survey", In Second Intl Conf S3T 2010, Sep. 2010, 5 pgs.

Dash et al, "Dynamic Faceted Search for Discovery-driven Analysis", In CIKM 2008, Oct. 2008, 10 pgs.

Diao et al, "Faceted Search and Browsing of Audio Content on Spoken Web", CIKM 2010, Oct. 2010, pp. 1029-1038.

Etzioni et al, "Web-scale Information Extraction in Knowitall: (Preliminary Results)", In Proceedings of WWW2004, May 2004, pp. 100-110.

Fumarola, et al., "HyLiEn: A Hybrid Approach to General List Extraction on the Web", In Proceedings of 20th international conference companion on World Wide Web, 2011, Apr. 21011, pp. 35-36.

Gholamrezazadeh et al, "A Comprehensive Survey on Text Summarization Systems", In Proceedings of CSA 2009, Dec. 2009, pp. 1-6.

Herdagdelen et al, "Generalized Syntactic and Semantic Models of Query Reformulation", In Proceeding of SIGIR 2010, Jul. 2010, 8 pgs.

Heyer et al, "Exploring Expression Data: Identification and Analysis of Coexpressed Genes", Genome Research,, Nov. 1999, 9:1106-1115.

Kozareva et al, "Semantic Class Learning from the Web with Hyponym Pattern Linkage Graphs", In Proceedings of ACL 2008, Jun. 2008, pp. 1048-1056.

Kuo et al, "Tag Clouds for Summarizing Web Search Results", In Proceedings of WWW 2007, May 2007, 2 pgs.

Latha et al, "AFGF: An Automatic Facet Generation Framework for Document Retrieval", In Proceedings of ACE 2010, Nov. 2010, 5 pgs.

Li et al, "Facetedpedia: Dynamic Generation of Query-dependent Faceted Interfaces for Wikipedia", In Proceedings of WWW 2010, Apr. 2010, 10 pgs.

Manning, "An Introduction to Information Retrieval", Apr. 2009, Cambridge University Press, 581 pgs.

Mitra et al, "Improving Automatic Query Expansion", In Proceedings of SIGIR 1998, Aug. 1998, pp. 206-214.

Nastase et al, "Decoding Wikipedia Categories for Knowledge Acquisition", Proceedings of AAAI 2008, Jul. 2008, pp. 1219-1224.

Pasca et al, "The Role of Query Sessions in Extracting Instance Attributes from Web Search Queries", ECIR 2010, Mar. 2010, 13 pgs.

Radev et al, "Centroid-based Summarization of Multiple Documents", Information Processing and Management, Nov. 2004, 40(6):919-938.

Riezler et al, "Translating Queries into Snippets for Improved Query Expansion", In Proceedings of COLING 2008, Aug. 2008, pp. 737-744.

Tamar, Sadeh, "Multiple Dimensions of Search Results", In Proceedings of Analogous Spaces Interdisciplinary Conference, May 15-17, 2008, pp. 1-13.

Shi et al, "Corpus-based Semantic Class Mining: Distributional vs. Pattern-based Approaches", . In Proceedings of COLING 2010, Aug. 2010, pp. 993-1001.

Shinzato et al, "A Simple WWW-based Method for Semantic Word Class Acquisition", In RANLP 2005, Sep. 2005, pp. 207-216.

Stoica et al, "Automating Creation of Hierarchical Faceted Metadata Structures", In NAACL HLT 2007, Apr. 2007, pp. 244-251.

Wang et al, "Iterative Set Expansion of Named Entities using the Web", Proceedings of ICDM 2008, Dec. 2008, pp. 1091-1096.

White et al, "Studying the use of Popular Destinations to Enhance Web Search Interaction", In Proceedings of SIGIR 2007, Jul. 2007, 8 pgs.

Wikipedia, "Dimension (Data Warehouse)", retrieved Oct. 26, 2011 from http://en.wikipedia.org/wiki/Dimension_ (data_warehouse), 4 pgs.

Xu et al, "Query Expansion using Local and Global Document Analysis", Proceedings of SIGIR 1996, Aug. 1996, pp. 4-11.

Yan, et al., "Facetedpedia: Enabling Query-Dependent Faceted Search for Wikipedia", In Proceedings of the 19th ACM International Conference on Information and Knowledge Management, Oct. 26-30, 2010, pp. 1927-1928.

Zhang et al, "Employing Topic Models for Pattern-based Semantic Class Discovery", In Proceedings of ACL-IJCNLP 2009, Aug. 2009, pp. 459-467.

Zhang et al, "Mining Search Engine Query Logs for Query Recommendation", Proceedings of WWW 2006, May 2006, pp. 1039-1040.

Zwol, et al., "Faceted Exploration of Image Search Results", In Proceedings of 19th International Conference on World Wide Web, Apr. 26-30, 2010, 10 pages.

* cited by examiner

Query: watches — 102

Dimensions:
1. martier brotting omicron denizen nacht heuer basio drolex more...
2. men's women's kids unisex children's more...
3. analog digital chronograph analog digital bracelet pendant more...
4. dress casual sport fashion luxury more...
5. black blue white green red brown more...

Web Search Results for Query "watches":
1. Watches from Oversale.xyz
   Watches by Meiko, Basio, Drolex, and more brand names. $2.85 shipping.
   www.oversale.xyz/watches/store.html
2. Shop Watches. 60+ brands. Provicta, Denizen, Basio ...
   Provicta Watches, Basio Watches, Drolex Watches, Brotting Watches all authentic.
   www.watchplanet.xyz
3. Orinoco.xyz: Watches, Men's Watches, Women's Watches, Children's Watches...
   Online shopping for Watches: Men's, Women's, Children's, Sport, Casual, Dress...
   www.orinoco.xyz/Watches

EXTRACTING QUERY DIMENSIONS FROM SEARCH RESULTS

BACKGROUND

Web search engines provide useful tools to enable users to find information on the web. Traditional search services enable a user to enter a search query in the form of one or more search terms and zero or more logical operators. After entering the query, the user may send a command to the search engine to execute a search based on the query. The search engine may then search the web for documents that satisfy the query to some degree, and provide the list of result documents to the user in the form of a list of identifiers such as Uniform Resource Locators (URLs), Uniform Resource Identifiers (URIs), Internet Protocol (IP) addresses, or other identifiers. The results list may also include excerpts from the result documents, descriptions, ranking information, advertisements, social networking information, and other information. Unfortunately, in many cases the search results may be noisy or lengthy, making it difficult for the user to find the desired information in the search results.

SUMMARY

This application describes techniques for extracting or mining query dimensions from search results. As used herein, a query dimension is a set of items (e.g., words, terms and/or phrases) that describe and/or summarize an aspect of a query. One or more query dimensions may be extracted from a set of web pages resulting from the execution of a search query, and such query dimensions may provide useful information about the query from various perspectives. The extracted query dimensions may then be stored and/or provided to a user to help the user more readily understand the query results and various aspects of the query, and to guide subsequent searches.

Extracting or mining query dimensions may include extracting item lists from the set of search results documents (e.g., web pages or web sites). This extraction may be based on an analysis of the documents to identify free text patterns (e.g., regular expressions), metadata tag patterns, and/or repeated region patterns within the documents. The extracted item lists may then be weighted to determine which lists are more or less important. For example, the weighting for a particular list may be based on a frequency of occurrence of the list's items in the results page, and/or occurrence of the list's items in a results page that appears higher in the search results. Weighting methods may include a document matching weight, an average invert document frequency weight, or a combination of the two. These methods are described in more detail below. The weighted lists may be clustered based on similar or identical items included in multiple lists to generate query dimensions, and the items within each query dimension may be ordered or ranked. The query dimensions may also be ranked based on their quality, and a predetermined number of the top-ranked query dimensions may be stored or provided to the user.

The determination of query dimensions may be performed in an online mode in response to a real-time user query. Query dimension extraction may also be performed in an offline mode for common queries, and the determined query dimensions may be stored and provided to future users requesting a search query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments are directed to the extraction of query dimensions from search results, to provide an improved search experience for users. Because each extracted query dimension includes a set of items that summarize an aspect of a search query, displaying query dimensions alongside search results may enable a user to understand important aspects of a search query without the need to browse multiple search result pages.

Figure 1:
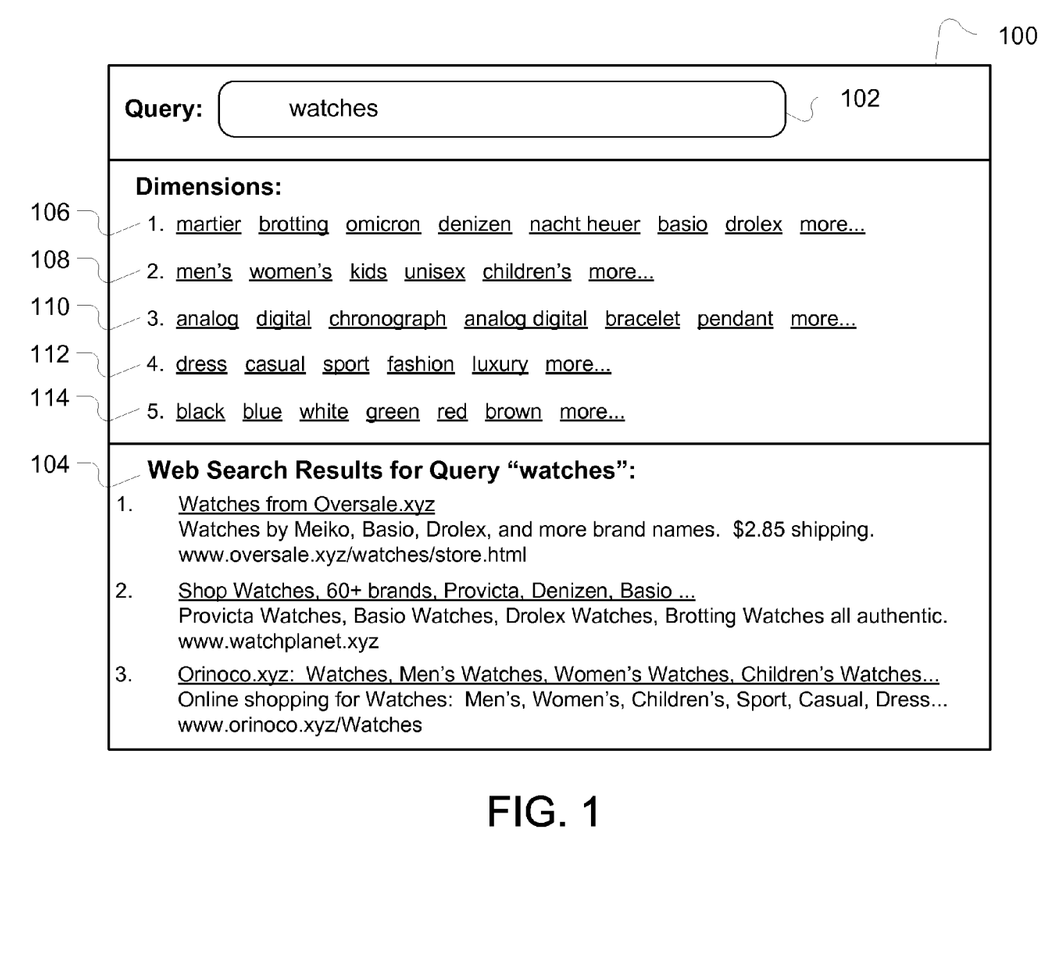
FIG. 1 illustrates an example search engine user interface, with example query dimensions generated based on the search results.

FIG. 1 illustrates example query result web pages and query dimensions extracted from and displayed with the result pages. User interface 100 is an example user interface for a search engine. The user interface 100 includes a query entry field 102, where a user has entered the search query "watches". The search engine has identified a list of result documents (e.g., web pages), and displayed them in results 104. As shown, various query dimensions have been extracted from the results. Dimension 106 is a list of items related to brands of watches. Dimension 108 is a list of items related to gender styles of watches. Dimension 110 is a list of items related to watch functionality types. Dimension 112 is a list of items related to formality and/or usage styles of watches. Dimension 114 is a list of items related to watch colors. In this example, the various extracted query dimensions each include a list of items that illustrate an aspect of the search query "watches". Displaying the query dimensions alongside the search results provides a user with a way of learning about different brands, types, styles, and/or categories of watches without the need to browse multiple web pages.

Moreover, in some embodiments the query dimensions themselves may be displayed as hyperlinks to facilitate further (e.g., more narrow) searches based on the query dimensions. For example, as shown in FIG. 1, query dimension 106 includes "martier" brand watches as an item, and a user may click on a hyperlink "martier" to request a subsequent search on "watches & martier". Though not shown in FIG. 1, in some embodiments user interface 100 may include features to enable a user to select multiple query dimensions for a subsequent search and/or to combine multiple query dimensions using various logical operators to compose a search query.

In some embodiments, the displayed query dimensions may provide a direct answer to a user question included in a query. For example, a user may query on "TV show season 5" and a generated query dimension may include items that are episode titles from season five of the television show. In such instances, displaying query dimensions may save the user additional browsing and/or searching, given that the query dimension itself directly provides the desired information. Extraction of query dimensions from search result web pages is described in more detail below, with reference to FIGS. 2-7.

Illustrative Environment

Figure 2:
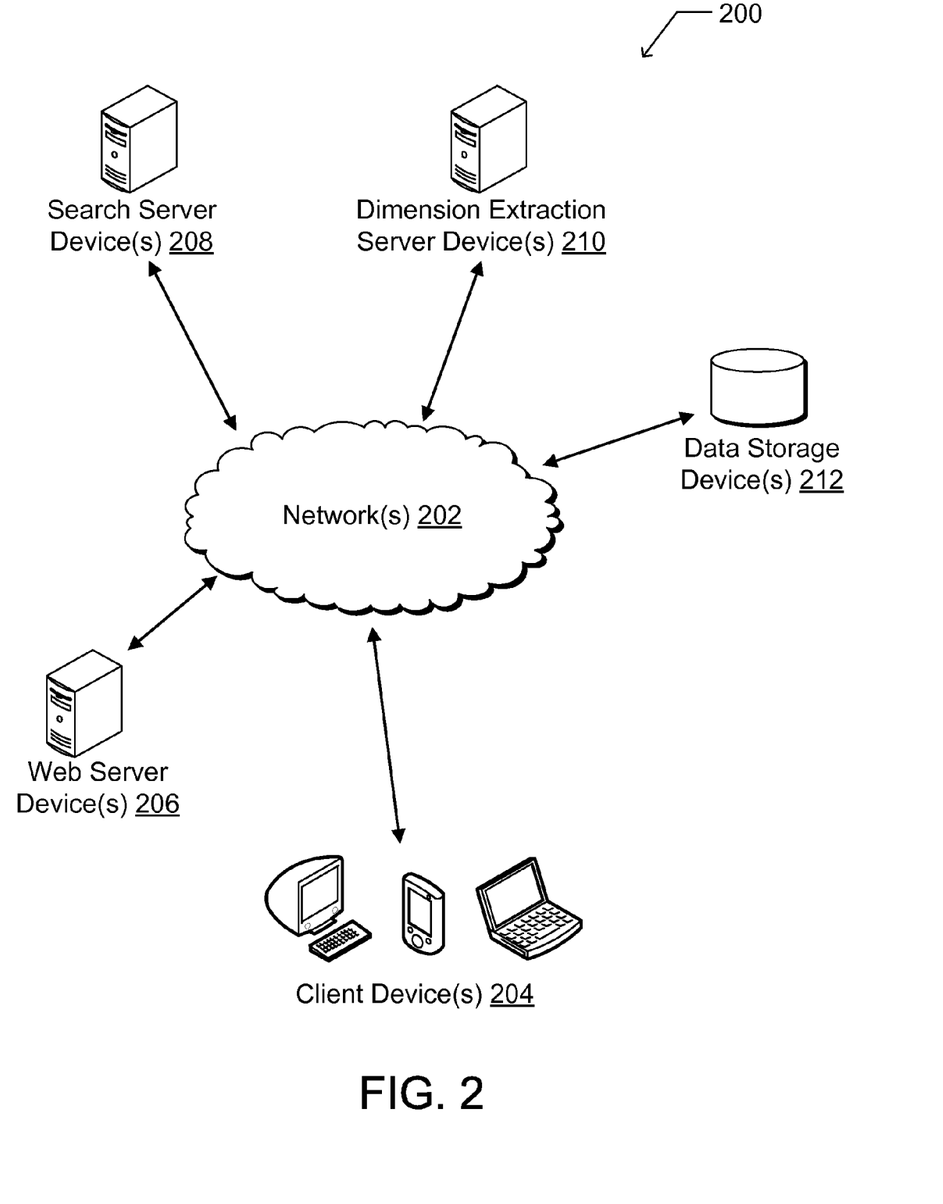
FIG. 2 is a schematic diagram depicting an example environment in which embodiments may operate.

FIG. 2 shows an example environment 200 in which embodiments may operate. As shown, the various devices of environment 200 communicate with one another via one or more networks 202 that may include any type of networks that enable such communication. For example, networks 202 include public networks such as the Internet, private networks such as an institutional and/or personal intranet, or some combination of private and public networks. Networks 202 also include any type of wired and/or wireless network, including but not limited to local area networks (LANs), wide area networks (WANs), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with end user(s). Client device(s) 204 include any type of computing device that a user may employ to send and receive information over networks 202. For example, client device(s) 204 include, but are not limited to, desktop computers, laptop computers, tablet computers, wearable computers, media players, automotive computers, mobile computing devices, smart phones, personal data assistants (PDAs), game consoles, mobile gaming devices, set-top boxes, and the like.

Client device(s) 204 generally include one or more applications, including but not limited to word processing applications, games, web browsers, e-mail client applications, text messaging applications, chat or instant messaging (IM) clients, and other applications. One or more of these applications may include search functionality as part of a user interface, to enable the user to input a search query, request that a search be performed based on the search query, and display search results and/or query dimensions.

As shown, environment 200 may further include one or more web server device(s) 206. Web server device(s) 206 include computing devices that are configured to serve content and/or provide services to users over network(s) 202. Such content and services include, but are not limited to, hosted static and/or dynamic web pages, social network services, e-mail services, chat services, blogging services, games, multimedia, and any other type of content, service or information that may be provided over networks 202.

Environment 200 also includes one or more search server device(s) 208. Search server device(s) 208 may be configured (e.g., with a search engine) to receive and execute web search queries entered by users and provide search results. In some embodiments, search server device(s) 208 perform query dimension extraction, generation, and/or mining as described further herein. In other embodiments, query dimension extraction is performed by one or more devices that are separate from search server device(s) 208, such as dimension extraction server device(s) 210. Dimension extraction server device(s) 210, as well as the other types of devices shown in FIG. 2, are described in greater detail herein with regard to FIG. 3.

In some embodiments, environment 200 also includes one or more databases or other data storage device(s) 212, configured to store data related to the various operations described herein. Such storage devices may be incorporated into one or more of the other devices depicted, or may be external storage devices separate from but in communication with one or more of the devices. For example, data storage device(s) 212 may store search query data and/or query dimension data generated by search server device(s) 208 and/or dimension extraction server device(s) 210.

Each of the one or more of the devices depicted in FIG. 2 may include multiple computing devices arranged in a cluster, server farm, cloud, or other grouping to share workload. Such groups of devices may be load balanced or otherwise managed to provide more efficient operations. Moreover, although various computing devices of environment 200 are described as clients or servers, each device may operate in either capacity to perform operations related to various embodiments. Thus, the description of a device as client or server is provided for illustrative purposes, and does not limit the scope of activities that may be performed by any particular device. Moreover, in some embodiments one or more of the devices of environment 200 may be combined. For example, search server device(s) 208 may be combined with dimension extraction server device(s) 210.

Illustrative Computing Device Architecture

Figure 3:
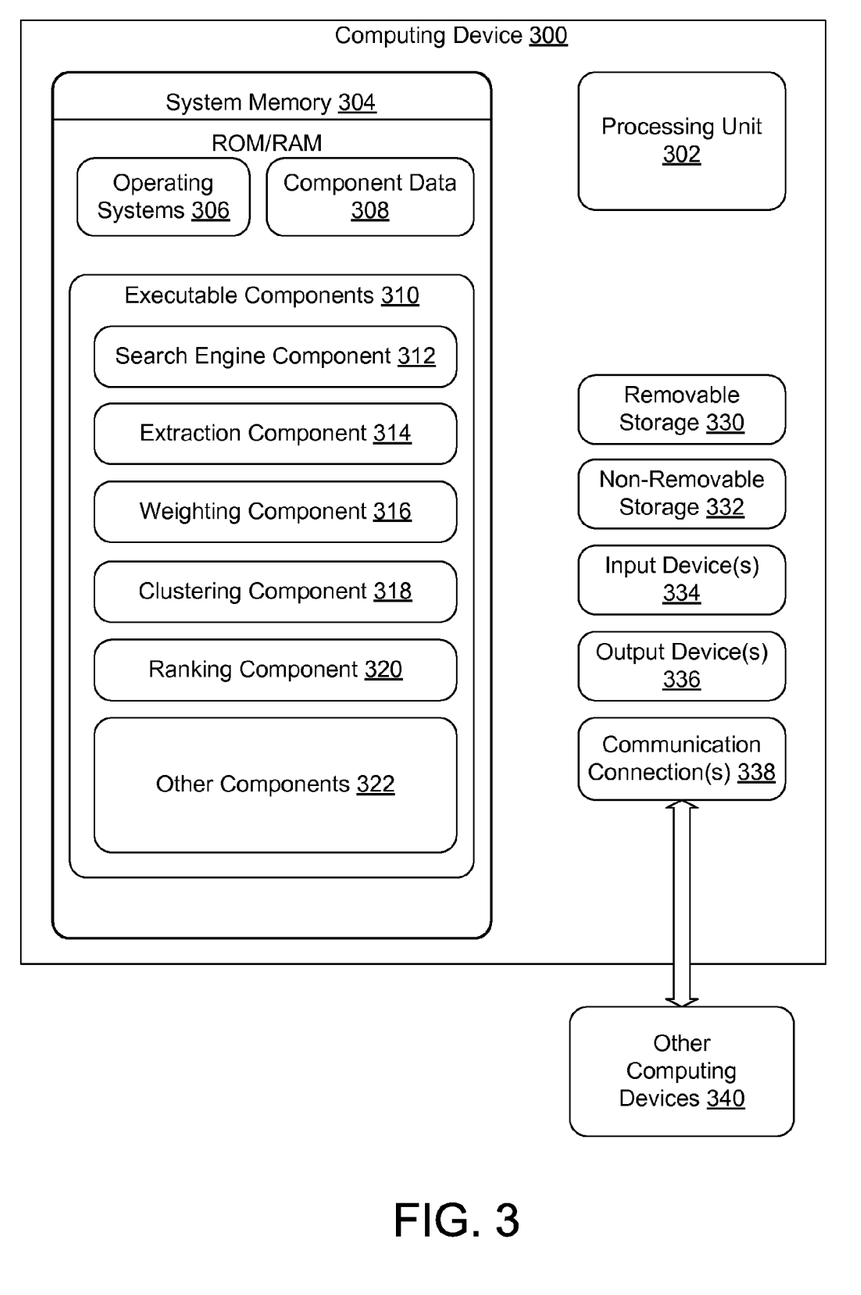
FIG. 3 is a diagram of an example computing device, in accordance with embodiments, that may be deployed as part of the example environment of FIG. 2.

FIG. 3 depicts a diagram for an example computer system architecture for one or more of the devices depicted in FIG. 2. As shown, computing device 300 includes processing unit 302. Processing unit 302 may encompass multiple processing units, and may be implemented as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Computing device 300 further includes a system memory 304, which may include volatile memory such as random access memory (RAM), static random access memory (SRAM), dynamic random access memory (DRAM), and the like. System memory 304 may further include non-volatile memory such as read only memory (ROM), flash memory, and the like. System memory 304 may also include cache memory. As shown, system memory 304 includes one or more operating systems 306, and one or more executable components 310, including components, programs, applications, and/or processes, that are loadable and executable by processing unit 302. System memory 304 may further store program/component data 308 that is generated and/or employed by executable components 310 and/or operating system 306 during their execution.

Executable components 310 include one or more components to implement functionality described herein on one or more of the devices depicted in FIG. 2. For example, executable components 310 may include a search engine component 312 that receives a search query from a user, executes the search query, and provides a list of search result documents (e.g., web pages) to the user. In some embodiments, search engine component 312 includes a user interface to enable the user to enter a search query and view the search results. In some embodiments, search engine component 312 also provides a list of query dimensions that have been extracted from result pages, as described below.

In some embodiments, executable components 310 also include an extraction component 314 that operates to extract one or more item lists from web pages, as part of a process to determine query dimensions. Executable components 310 may also include a weighting component 316 to weight the extracted item lists, a clustering component 318 to cluster or otherwise combine item lists based on similar items within the lists to generate query dimensions, and a ranking component 320 to rank query dimensions and/or rank items within the query dimensions based on their frequency and/or importance. The operation of each of these components is described in greater detail below.

Executable components 310 may further include other components 322. In various embodiments, executable components 310 may be distributed to operate on one device or on more than one device, in virtually any combination. Thus, the depiction of executable components 310 on the single computing device 300 in FIG. 3 should not be construed as limiting.

As shown in FIG. 3, computing device 300 may also include removable storage 330 and/or non-removable storage 332, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 334, including but not limited to a keyboard, a mouse, a pen, a game controller, a voice input device for speech recognition, a touch input device, and the like. Computing device 300 may further include output device(s) 336 including but not limited to a display, a printer, audio speakers, a haptic output, and the like. Computing device 300 may further include communications connection(s) 338 that allow computing device 300 to communicate with other computing devices 340, including client devices, server devices, databases, and/or other networked devices available over network(s) 202.

Illustrative Processes

Figure 4:
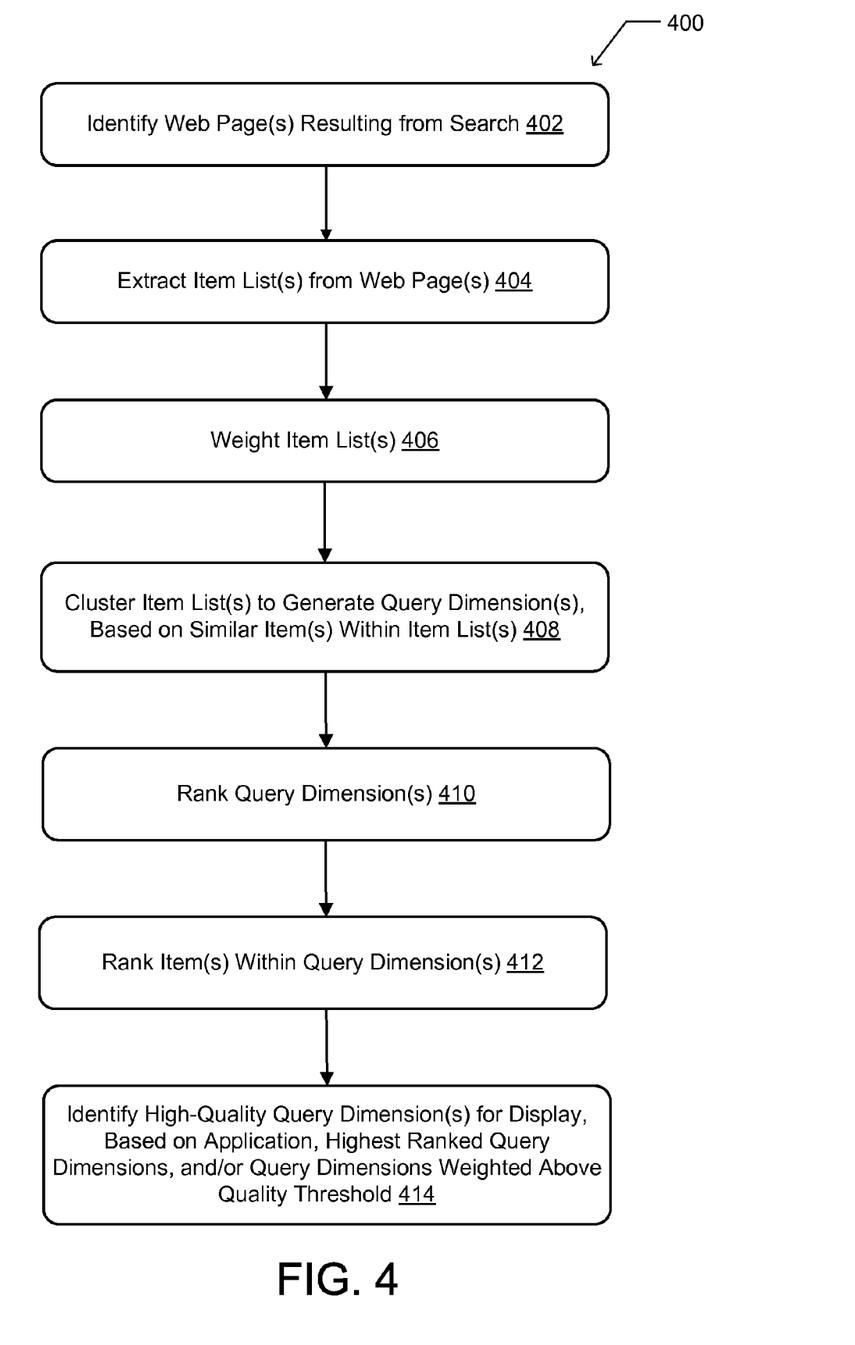
FIG. 4 depicts a flow diagram of an illustrative process for generating query dimensions, in accordance with embodiments.
Figure 5:
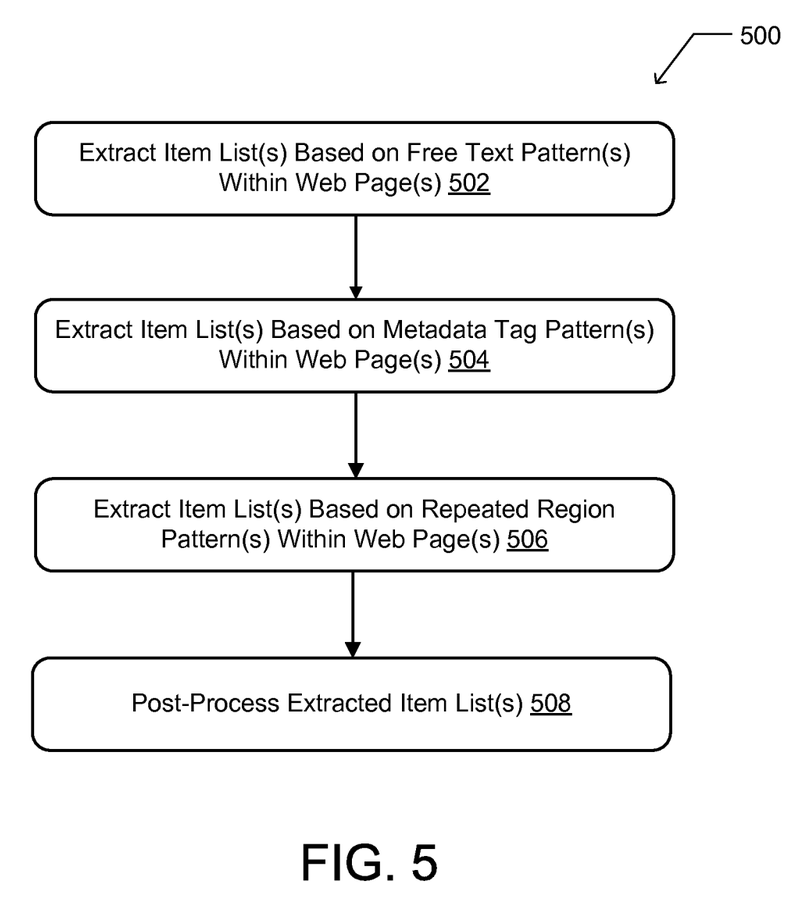
FIG. 5 depicts a flow diagram of an illustrative process for extracting item lists from web pages, in accordance with embodiments.
Figure 7:
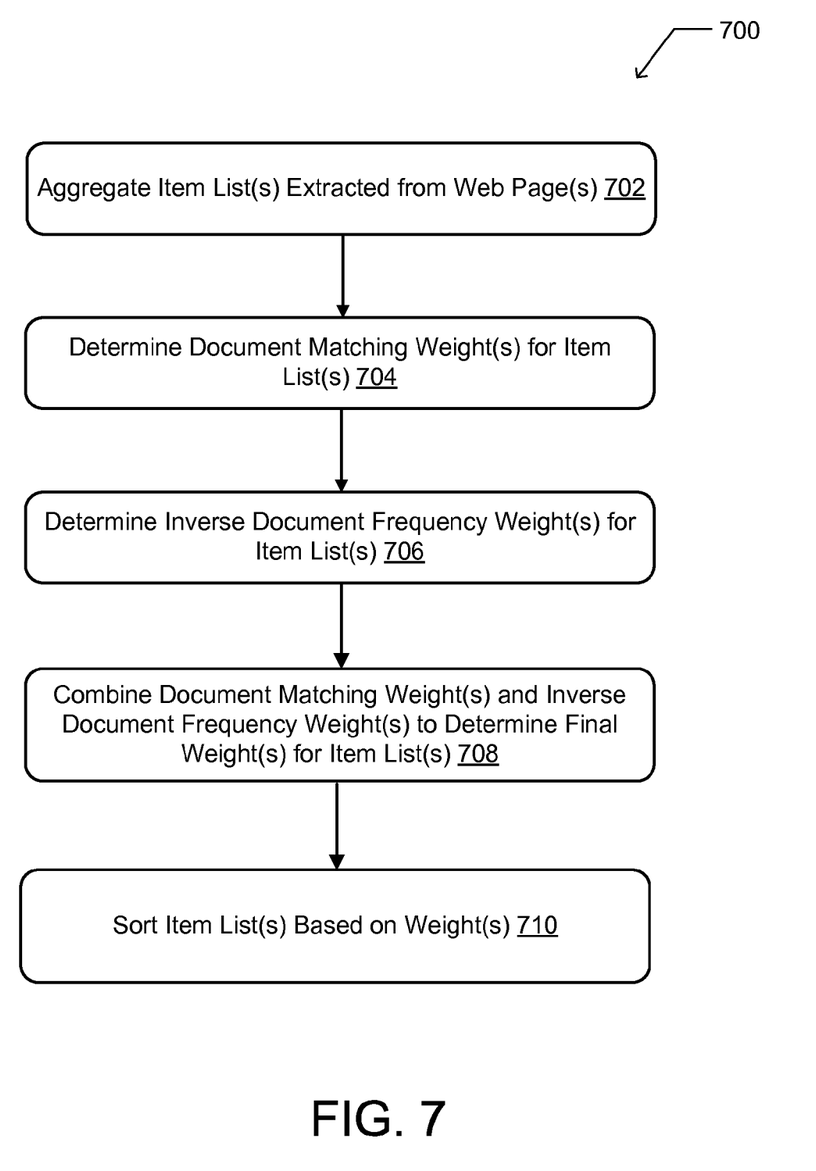
FIG. 7 depicts a flow diagram of an illustrative process for weighting item lists, in accordance with embodiments.

FIGS. 4, 5, and 7 depict flowcharts showing example processes in accordance with various embodiments. The operations of these processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, subdivided into multiple sub-operations, and/or executed in parallel to implement the described processes.

FIG. 4 depicts an example process 400 for extracting query dimensions from one or more web pages for a search query. In some embodiments, process 400 may be performed by one or more components executing on search server device(s) 208 or dimension extraction server device(s) 210, such as extraction component 314, weighting component 316, clustering component 318, and/or ranking component 320.

At 402 one or more document(s) are identified resulting from a search performed based on a search query. The results document(s) may include web page(s) or other forms of content, and may be listed with identifying information such as a URL, URI, IP address, and the like. In some embodiments, the search results are not limited to a particular domain such as products, people, and the like. Such an open domain approach may produce a more comprehensive collection of query dimensions for the search query. In some embodiments, a certain number (e.g., five) of the top result pages are selected for query dimension extraction. In some embodiments, the result documents may include one or more web sites that each include multiple web pages.

At 404 one or more item list(s) are automatically extracted from the result web page(s) identified at 402. An item list is a list of words, terms, or phrases. In many cases, information in a web page or other document is provided in the form of a list to increase usability and aesthetic quality of the document. Certain patterns may be used to identify lists in web pages. This pattern-based extraction of item list(s) is described in greater detail with regard to FIGS. 5, 6A, and 6B.

FIG. 5 depicts an example process 500 for extracting item list(s) from documents. In some embodiments, item list extraction is based on recognition of free text patterns, metadata tag patterns, and/or repeated region patterns within a document. At 502 one or more item lists are extracted from the web page(s) based on free text patterns identified within the web page(s). In some embodiments, this includes the extraction of all text from a document and a splitting of the text into sentences based on periods or other sentence delimiters.

One or more patterns (e.g., regular expressions) may then be employed to extract matching list items from each sentence. In some embodiments, a search may be performed for a pattern "item {, item}* (and|or) {other} item" in each sentence of a document. For example, if a web page includes the sentence "We shop for gorgeous wrist watches from Meiko, Mulova, Brotting, Denizen, Drolex, or Provicta." This may lead to an item list consisting of "Meiko, Mulova, Brotting, Denizen, Drolex, Provicta."

In some embodiments, a pattern "{^item (:|-).+$)+" is employed to extract lists from semi-structured paragraphs. Such a pattern may be used to extract lists from continuous lines that are comprised of two parts separated by a dash or a colon. In such cases, the first parts of these lines may be extracted to form an item list. For example, the following paragraph:

. . . are highly important for the following reasons:
Consistency—every fact table is filtered consistently
Integration—queries are able to drill different processes
Reduced development time to market—the common dimensions are available without additional analysis may be analyzed to extract the list "Consistency, Integration, Reduced development time to market."

At 504 one or more item lists are extracted from the web page(s) based on metadata tag patterns identified within the web page(s). The web page(s) may include metadata according to various markup languages such as Hypertext Markup Language (HTML), Extensible Markup Language (XML), Extensible Hypertext Markup Language (XHTML), LaTeX, GenCode, Generalized Markup Language (GML), Standard Generalized Markup Language (SGML), Scribe, or other forms of metadata. In some embodiments, item lists(s) are extracted from web pages based on an identification of list-style metadata tags in the web pages. For example, HTML tags SELECT, UL, OL, and TABLE may be used to identify and extract item lists from web pages. Table 1 lists example HTML source from which item lists may be extracted.

TABLE 1

SELECT:
<select name="ProductFinder2" id="ProductFinder2">
<option value="WatchBrands.htm">Watch Brands</option>
<option value="Brands-Basio.htm">Basio</option>
<option value="Brands-Brotting.htm">Brotting</option>
<option value="Brands-Denizen.htm">Denizen</option>
<option value="Brands-Drolex.htm">Drolex</option>
<option value="Brands-Martier.htm">Martier</option>
UL:
<ul><li><a href="/rst.asp?q=dive>Dive</a></li>
<li><a href="/rst.asp?q=titanium>Titanium</a></li>
<li><a href="/rst.asp?q=automatic>Automatic</a></li>
<li><a href="/rst.asp?q=quartz>Quartz</a></li>
<li><a href="/rst.asp?q=gold>Gold</a></li></ul>
TABLE:
<table width="100%">
<tr><td width="10%"></td><td>White</td></tr>
<tr><td></td><td height="20">Red</td></tr>
<tr><td></td><td height="20">Black</td></tr>
<tr><td></td><td height="20">Pink</td></tr>
<tr><td height="4" colspan="2"></td></tr></table>

For the SELECT tag, text from child tags (e.g., OPTION tags) may be extracted to form an item list. In some embodiments, the first item is left out of the list if it starts with certain predefined text such as "select" or "choose." In the example SELECT tag shown in Table 1, the extracted list is "Watch Brands, Basio, Brotting, Denizen, Drolex, Martier." For UL and OL tags, text is extracted from child tags (e.g., IL tags) to form a list. In the example UL tag of Table 1, the extracted list is "Dive, Titanium, Automatic, Quartz, Gold."

For the TABLE tag, a list may be extracted from each column and/or each row of the table. Thus, for a table containing m rows and n columns, at most m+n lists may be extracted. In some embodiments, for each column cells within THEAD or TFOOT tags are regarded as table headers and are left out of the extracted list. In some embodiments, the first cell of each column may be left out when its cascading style is different from other cells in the column. In the example TABLE tag of Table 1, the extracted list is "White, Red, Black, Pink." Although the examples given above specifically describe HTML tags, embodiments are not so limited and other types of metadata tags may be employed to extract item lists.

At 506 one or more item lists are extracted from the web pages based on repeated region patterns within the web pages. In some cases, web page designers organize information on a page in the form of organized blocks or other structures (e.g., visual structures) in a repeated style. In such instances, item lists may be extracted from the blocks based on a determination of a similarity in style (e.g., color, font, line weight, block size, position, and the like) between the blocks. In some embodiments, such similarities are identified based on an examination of the Document Object Model (DOM) tree for a page. Repeat regions (e.g., regions that contain more than one block) are identified based on similarities detected in the DOM tree of a page, and/or in individual DOM trees corresponding to the blocks. Then, the HTML nodes may be extracted from each block and grouped based on tag names and/or display styles, and text from the nodes may be extracted as one or more item lists.

At 508 one or more post-processing steps are performed on the extracted item list(s). In some embodiments, such post-processing includes a normalization of the items in the lists by removing unneeded symbol characters (e.g., "[" and "]"), converting uppercase letters to lowercase, and removal of long items that contain more than a certain number (e.g., 20) terms. In some embodiments, post-processing includes removal of lists that contain less than a certain number (e.g., 2) of unique items, and/or removal of lists that contain more than a certain number (e.g., 200) of unique items.

Figure 6A:
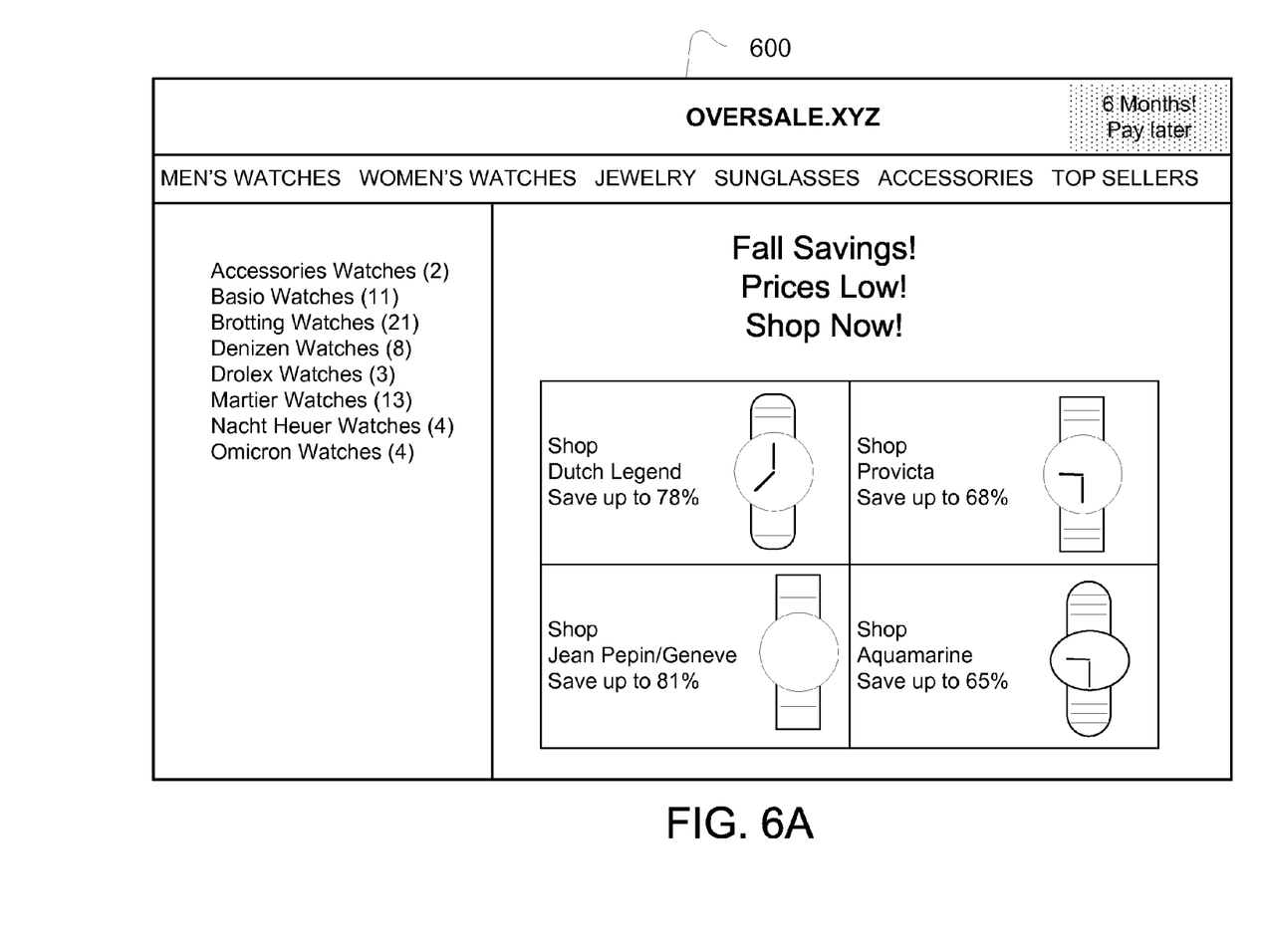
FIGS. 6A and 6B depict an example web site from which item lists may be extracted, in accordance with embodiments.
Figure 6B:
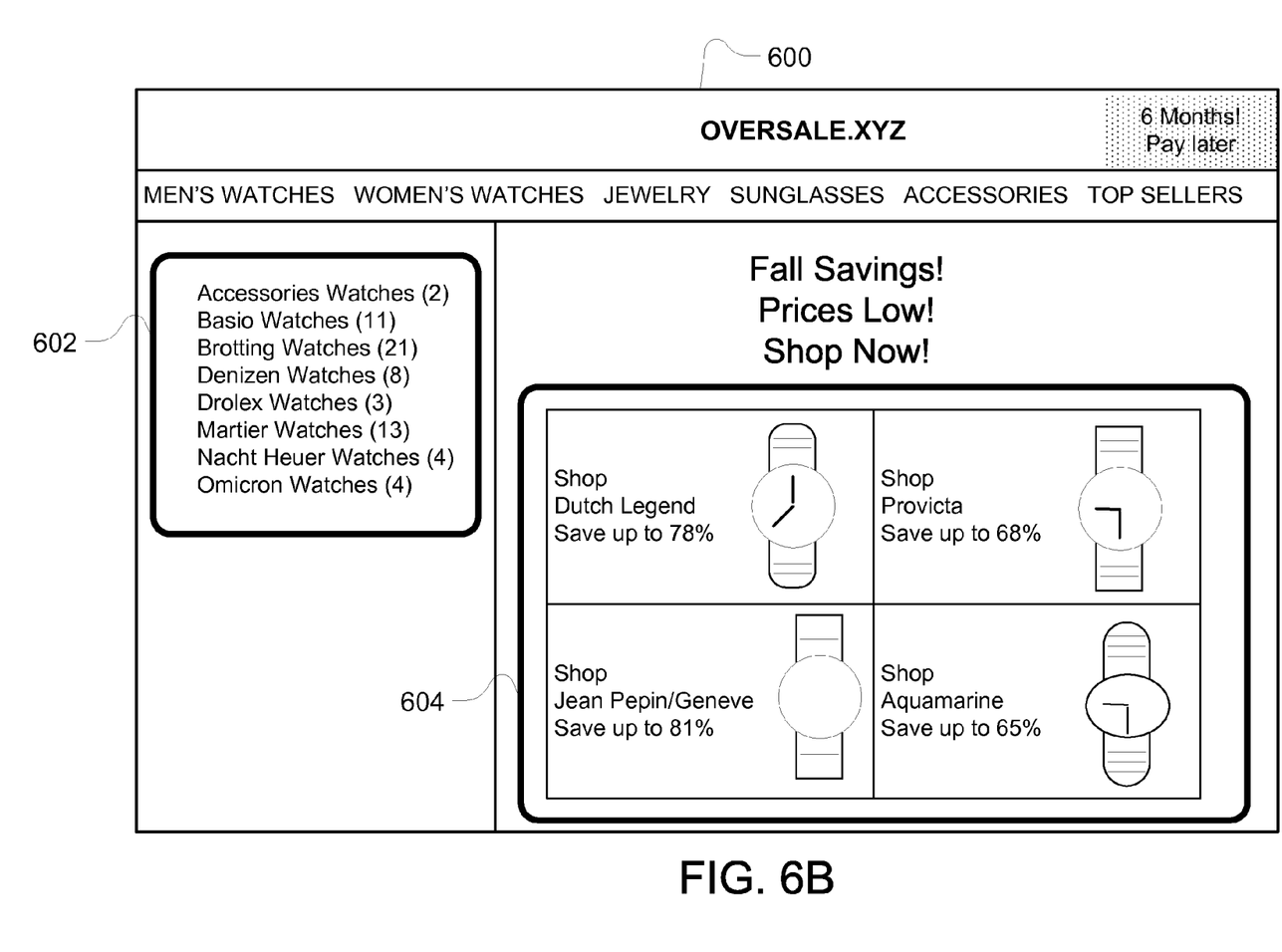

Embodiments may employ free text, metadata tag, and repeated region pattern recognition techniques individually or in any combination, and may further employ other techniques for item list extraction. FIGS. 6A and 6B illustrate an example web page and the extraction of item lists from the web page. FIG. 6A depicts an example web page 600 associated with online merchant "oversale.xyz" selling watches and other items. FIG. 6B shows the same web page 600 with a graphical illustration of item list extraction. Two item lists are shown extracted from web page 600. Item list 602 is an example of a list extracted through the metadata tag pattern recognition described above. Item list 604 is an example of a list extracted through the repeated region pattern recognition described above.

Returning to FIG. 4, at 406 the one or more extracted item lists are weighted. In some embodiments, such weighting is based on a frequency of occurrence of the item lists or items of the item lists in the web pages. Moreover, in some embodiments the weighting is based on which pages the item lists were extracted from. For example, item lists extracted from higher ranked search result pages may be given a greater weight than item lists extracted from lower ranked pages. Weighting may also serve as a means to remove less informative (e.g., noise) lists from the analysis. Table 2 provides examples of less informative lists that may be removed through weighting.

TABLE 2

| List ID | List items (separated by commas) |
|---------|-----------------------------------|
| 1 | we recommend, my account, help |
| 2 | home, customer service, my account, tracking, FAQs |
| 3 | read, edit, view, history |
| 4 | brovado 605635 luno two tone . . . 547.50 717.00 1 rating 1 review, brovado museum strap 0690299 . . . 225.00 395.00 1 rating, denizen caliber 2100 av0031 . . . 299.00 350.99 11 ratings |

In this example, the first three lists of Table 2 were derived from navigational links designed to help users navigate between pages of a web site. The fourth list is an example of a list extraction error in which several types of information are included in the same item list. Some embodiments, remove such lists from the analysis as not informative to the query, by means of the weighting described below. Thus, in some embodiments weighting serves to identify good lists, e.g. those higher quality lists that are at least partially present in multiple web pages and/or contain items that are informative to the query. Such item lists tend to generate more useful query dimensions.

Item list weighting is described in greater detail with regard to FIG. 7, which depicts an example process 700 for item list weighting. At 702 the one or more item lists extracted from the web page(s) are collected in preparation for the weighting analysis. At 704 a document matching weight is determined for each item list. In some embodiments, document matching weight determination is a weighting technique in which a higher weight is assigned to a list based on its appearance in a more highly ranked search result page. Document matching weight $S_{DOC}$ may be calculated by Equation 1 below:

$$S_{DOC} = \Sigma_{d \in R}(s_d^m * s_d^r) \quad \text{(Equation 1)}$$

In this equation, d is a document (e.g., web page) in the set of results R. $s_d^m$ is the percentage of items of the list contained in document d. In some embodiments, a list l is determined to be supported by document d if d contains all items of list l, or more than a certain number of items in the list. The more items of the list d contains, the stronger d supports the list. If $|d \cap l|$ is the number of shared items in d and l, and $|l|$ is the number of items contained in list l, then $s_d^m$ may be given by Equation 2:

$$s_d^m = \frac{|d \cap l|}{|l|} \quad \text{(Equation 2)}$$

Another term in Equation 1, $s_d^r$, measures the importance of document d, based on the rank of d within search results R. Documents ranked higher in the search results tend to be more relevant to the search query, and may be given greater importance by embodiments. In some embodiments, $s_d^r$ may be given by Equation 3:

$$s_d^r = 1/\sqrt{\text{rank}_d} \quad \text{(Equation 3)}$$

In this equation, $\text{rank}_d$ is the rank of document d. Thus, the higher d is ranked in the results list, the larger is score $s_d^r$.

At 706 an average inverse document frequency weight is determined for each of the item lists. In some embodiments, this weight reflects the idea that a list has less value if it is composed of common items in the corpus of words in the relevant language. The inverse document frequency weight $S_{IDF}$ may be calculated according to Equations 4 and 5 below:

$$S_{IDF} = \frac{1}{|l|} \cdot \sum_{e \in l} idf_e \quad \text{(Equation 4)}$$

where $$idf_e = \log \frac{N - N_e + 0.5}{N_e + 0.5} \quad \text{(Equation 5)}$$

In these equations, $N_e$ is the total number of documents that contain the item e in the corpus, and N is the total number of documents. In some embodiments, the corpus used is a collection of web pages from archived sites on the web. Various corpuses (e.g., the ClueWeb09 collection) may be employed by embodiments.

In some embodiments, at 708 the document matching weight and inverse document frequency weight for each item list may be combined to determine a final weight for each item list, such that the final weight of a list l is indicated by Equation 6:

$$S_l = S_{DOC} * S_{IDF} \quad \text{(Equation 6)}$$

In some embodiments, either the document matching weight or the inverse document frequency weight is used as a final weight instead of using a combination of the two. At 710 the item lists are sorted based on their final weights.

Returning to FIG. 4, at 408 the weighted item lists are clustered to generate one or more query dimensions. In some embodiments, clustering includes integrating item lists that have similar and/or identical items, such that two item lists are clustered together if they share a sufficient number of items. Some embodiments employ a quality threshold algorithm for clustering. In such cases, a distance $d_l$ may be defined between two lists $l_1$ and $l_2$, as shown in Equation 7:

$$d_l(l_1, l_2) = 1 - \frac{|l_1 \cap l_2|}{\min\{|l_1|, |l_2|\}} \quad \text{(Equation 7)}$$

where $|l_1 \cap l_2|$ is the number of shared items within $l_1$ and $l_2$. Two item lists may be placed in the same cluster if the distance between them is below a certain threshold. Moreover, in some embodiments a linkage distance between clusters is calculated to determine whether two clusters can be combined into a single cluster. The linkage distance $d_c$ between two clusters $c_1$ and $c_2$ may be calculated using a distance function such as that given by Equation 8:

$$d_c(c_1, c_2) = \max_{l_1 \in c_1, l_2 \in c_2} d_l(l_1, l_2) \quad \text{(Equation 8)}$$

In some embodiments, two clusters may be merged if the linkage distance between them is below a certain threshold. Thus, in some embodiments two groups of lists may be merged when every pair of lists between the two groups is similar enough.

The quality threshold algorithm described above assumes that all data is equally important, such that the cluster that has the highest number of data points (e.g., item lists) is selected in each iteration. However, some embodiments employ a modified quality threshold algorithm which diverges from the quality threshold algorithm by assuming that item lists are not equally important. Thus, in some embodiments a modified quality threshold clustering algorithm is used to group similar lists into clusters. Such an algorithm may ensure higher quality clustering by finding large clusters whose diameters do not exceed a particular diameter threshold. In some embodiments, the diameter of a cluster is the longest distance between each pair of data points within the cluster. Such an algorithm may also prevent dissimilar data from being clustered together. In the modified quality threshold algorithm, better lists (e.g., higher weighted lists) are grouped together earlier in the process.

In some embodiments, a maximum diameter $Dia_{max}$ and a minimum weight $W_{min}$ are selected for the clusters. Then, a candidate cluster is built for the most important point (e.g., the highest weighted item list) by iteratively including each other point that is closest to group until the diameter of the cluster surpasses the threshold $Dia_{max}$. This candidate cluster may then be saved if the total weight of its points $w_c$ is not smaller than $W_{min}$. All points in the cluster may then be removed from further consideration, and the process may repeat recursively with the reduced set of points.

In this way, the modified quality threshold algorithm may operate to identify a larger number of neighbors for the more important points (e.g., item lists that are higher weighted), and therefore clusters may be biased toward the more important points. As an example, suppose six item lists, listed in order of descending weight such that $S_1 > S_2 > S_3$ and so on:
$l_1$=(martier, brotting, omicron, denizen)
$l_2$=(brotting, omicron, denizen, nacht heuer)
$l_3$=(brotting, omicron, denizen, movie, music, book)
$l_4$=(movie, music, book)
$l_5$=(music, book, radio)
$l_6$=(movie, book, radio)

In this case, the unmodified quality threshold algorithm may ignore the weights of these lists and generate a cluster ($l_3$, $l_4$, $l_5$, $l_6$) with $Dia_{max}$=0.6. However, the modified quality threshold algorithm may generate a cluster ($l_1$, $l_2$, $l_3$) based around the highest weighted point, i.e. list $l_1$. This second result may be favorable, particularly in cases where $S_1$ is much greater than $S_3$. Moreover, in some embodiments the modified algorithm may proceed more efficiently than the unmodified algorithm, given that the modified algorithm is more likely to generate a single candidate cluster whereas the unmodified algorithm generates a candidate cluster for each remaining item list.

In some embodiments, the weight of a cluster is computed based on a number of web pages from which its lists are extracted. Further, in some embodiments web sites (e.g., of multiple web pages) may be considered in the clustering process instead of individual web pages, because web pages from the same web site may share similar or identical page templates and thus contribute duplicate lists to the process. In some embodiments, $Dia_{max}$=0.6 and $W_{min}$=3, such that lists of a qualified cluster are from at least three unique web sites. However, other values may be employed by embodiments. In some embodiments, after clustering is complete the clustered lists are identified as candidate query dimensions.

At 410 the candidate query dimensions are ranked. In some embodiments, query dimension ranking is based on two criteria. First, a dimension may be ranked higher if the item lists that formed the dimension were extracted from more unique web sites or web pages. Second, a dimension may be ranked higher if the item lists that formed the dimension are more important (i.e., have higher weights). Based on these criteria, an importance $S_d$ of dimension d may be given by Equation 9:

$$S_d = \Sigma_{s \in Sites(d)} \max_{l \in d, l \in s} S_l \qquad \text{(Equation 9)}$$

where $S_l$ is the weight of a list l, and Sites(d) is the collection of all the web sites (or web pages) that were considered in generating dimension d.

At 412 the one or more items within a query dimension are ranked. In some embodiments, the importance of a particular item within a query dimension depends on how many item lists contained the item and where the item ranked in those lists, given that a particular item may have been placed higher in a list by the web site or web page designer if that item is more important in some way. In some embodiments, the weight $S_{e|d}$ of an item e within a dimension d is given by Equation 10:

$$S_{e|d} = \sum_{s \in Sites(d)} w(d, e, s) = \sum_{s \in Sites(d)} \frac{1}{\sqrt{AvgRank_{d,e,s}}} \qquad \text{(Equation 10)}$$

where w(d, e, s) is the weight contributed by web site (or web page) s, and $AvgRank_{d,e,s}$ is the average rank of item e within all lists extracted from web site (or web page) s.

In some embodiments, the items in each query dimension are sorted based on their determined weights. In some embodiments, there is a further step of determining one or more qualified items of a dimension based on whether the weight for an item is above a certain threshold. Moreover, in some embodiments, a qualified item may also be dependent on whether the item occurred first in at least one list from at least one web page, and/or whether the item is present in a list from at least one other web page.

At 414 in some embodiments the determined candidate query dimensions may be further filtered to determine one or more high-quality query dimensions. In some embodiments this determination may be based on whether a query dimension has a weight above a certain quality threshold, the weight determined at 410. Further, in some embodiments determination of high-quality query dimensions may be based on the particular application that the user is running to request the search. Once the high-quality query dimensions are determined, they may be stored in a database and/or provided for display to the user alongside the top search results for the user's search query.

Moreover, in some embodiments a predetermined number of the highest ranked dimensions (e.g., those with the highest weight) may be stored and/or provided to the user, and this predetermined number may be based on the particular application that the user is running to request the search. In those embodiments where the high-quality dimensions are determined as those with a weight above a predetermined quality threshold, the quality threshold may be based on the particular application.

In some embodiments, extraction of query dimensions as described above may occur online and/or in real-time, in response to a user query. However, such online processing may be resource intensive and may increase the time required to respond to the user's query. Given that, in some embodiments, extraction of query dimensions may be performed in an offline mode for common search queries, and the results may be stored in a database to be provided to users at a future time.

CONCLUSION

Although the techniques have been described in language specific to structural features and/or methodological acts, it is to be understood that the appended claims are not necessarily limited to the specific features or acts described. Rather, the specific features and acts are disclosed as example forms of implementing such techniques.

What is claimed is:

1. A method comprising:
identifying a plurality of web pages resulting from a search based on a search query;
employing at least one processor to automatically extract one or more item lists from one or more web pages of the plurality of web pages based at least on one or more list pattern identification techniques, the one or more list pattern identification techniques including identifying terms that are in parallel positions in a sentence or continuous lines according to a text pattern in a respective web page of the one or more web pages as a respective item list of the one or more item lists, the respective item list of the one or more item lists including two or more related words or phrases included in the respective web page of the one or more web pages, wherein at least one of the two or more related words or phrases is related to the search query and does not include a keyword for the search query;
weighting the one or more item lists;
clustering the one or more weighted item lists based on a determination that at least some of the item lists include one or more similar items; and
generating, based at least in part on the clustering, one or more query dimensions that summarize an aspect of the search query, at least one of the one or more query dimensions comprising a plurality of items from a cluster of weighted item lists.

2. The method of claim 1, further comprising:
weighting the one or more query dimensions; and
identifying one or more high-quality query dimensions as the one or more query dimensions that have a weight higher than a quality threshold value.

3. The method of claim 1, wherein the text pattern includes one or more free text patterns.

4. The method of claim 1, wherein the one or more list pattern identification techniques further comprise identifying one or more metadata tag patterns within the one or more web pages.

5. The method of claim 1, wherein the one or more list pattern identification techniques further comprise identifying one or more repeated region patterns within the one or more web pages.

6. The method of claim 1, wherein weighting the one or more item lists is based on a document matching weight.

7. The method of claim 1, wherein weighting the one or more item lists is based on an inverse document frequency weight.

8. The method of claim 1, wherein weighting the one or more item lists is based on a combination of a document matching weight and an inverse document frequency weight.

9. The method of claim 1, further comprising ranking one or more items within each of the one or more query dimensions based on a frequency of the one or more items within the one or more item lists.

10. A system comprising:
at least one processor; and
one or more memories storing computer readable instructions that, when executed by the at least one processor, direct the system to perform acts comprising:
extracting one or more item lists from one or more webpages of a plurality of web pages resulting from execution of a search query based at least on one or more list pattern identification techniques, the one or more list pattern identification techniques including identifying terms that are in parallel positions in a sentence or continuous lines according to a text pattern in a respective web page of the one or more web pages as a respective item list of the one or more item lists, the respective item list of the one or more item lists including two or more related words or phrases included in the respective web page of the one or more web pages, wherein at least one of the two or more related words or phrases is related to the search query and does not include a keyword for the search query;
weighting each of the one or more item lists;
clustering the weighted one or more item lists based on a determination that at least some of the item lists include one or more similar items; and
generating, based at least in part on the clustering, one or more query dimensions that summarize a characteristic of the search query, at least one of the one or more query dimensions comprising a plurality of items from a cluster of weighted item lists.

11. The system of claim 10, wherein the acts further comprise receiving the search query and executing a search based on the search query.

12. The system of claim 10, wherein the acts further comprise ranking one or more items within each of the one or more query dimensions based on a frequency of the one or more items within the one or more item lists.

13. The system of claim 10, wherein the acts further comprise ranking the one or more query dimensions.

14. The system of claim 13, wherein the ranking includes identifying one or more high-quality query dimensions as a predetermined number of highest ranked query dimensions.

15. The system of claim 10, wherein the one or more list pattern identification techniques further comprise at least one of:
one or more metadata tag patterns; and
one or more repeated region patterns.

16. A method comprising:
ranking a plurality of web pages resulting from a search based on a search query;
employing at least one processor to extract one or more item lists from the plurality of web pages based at least on one or more list pattern identification techniques, a respective item list of the one or more item lists including two or more related words or phrases included in a respective web page of the plurality of web pages;
weighting each of the one or more item lists, the weighting including assigning a first weight to a first item list from a first web page and a second weight to a second item list from a second web page, the first weight being greater than a second weight, in response to determining that a ranking of the first web page is higher than a ranking of the second web page in the plurality of web pages; and
clustering the one or more weighted item lists to generate one or more query dimensions to be displayed alongside a list of the plurality of web pages and that summarize a characteristic of a search query, at least one of the one or more query dimensions comprising a plurality of similar items from a cluster of weighted item lists.

17. The method of claim 16, further comprising identifying at least one of the one or more dimensions to be displayed within an application, the identifying based at least in part on the application.

18. The method of claim 16, wherein the clustering is based on a determination that at least some of the item lists include one or more similar items.

19. The method of claim 16, further comprising ranking one or more items within each of the one or more dimensions based on a frequency of the one or more items within the one or more item lists.

20. The method of claim 16, wherein weighting the one or more item lists is further based on at least one of a document matching weight and an inverse document frequency weight.

* * * * *